Figure 1:
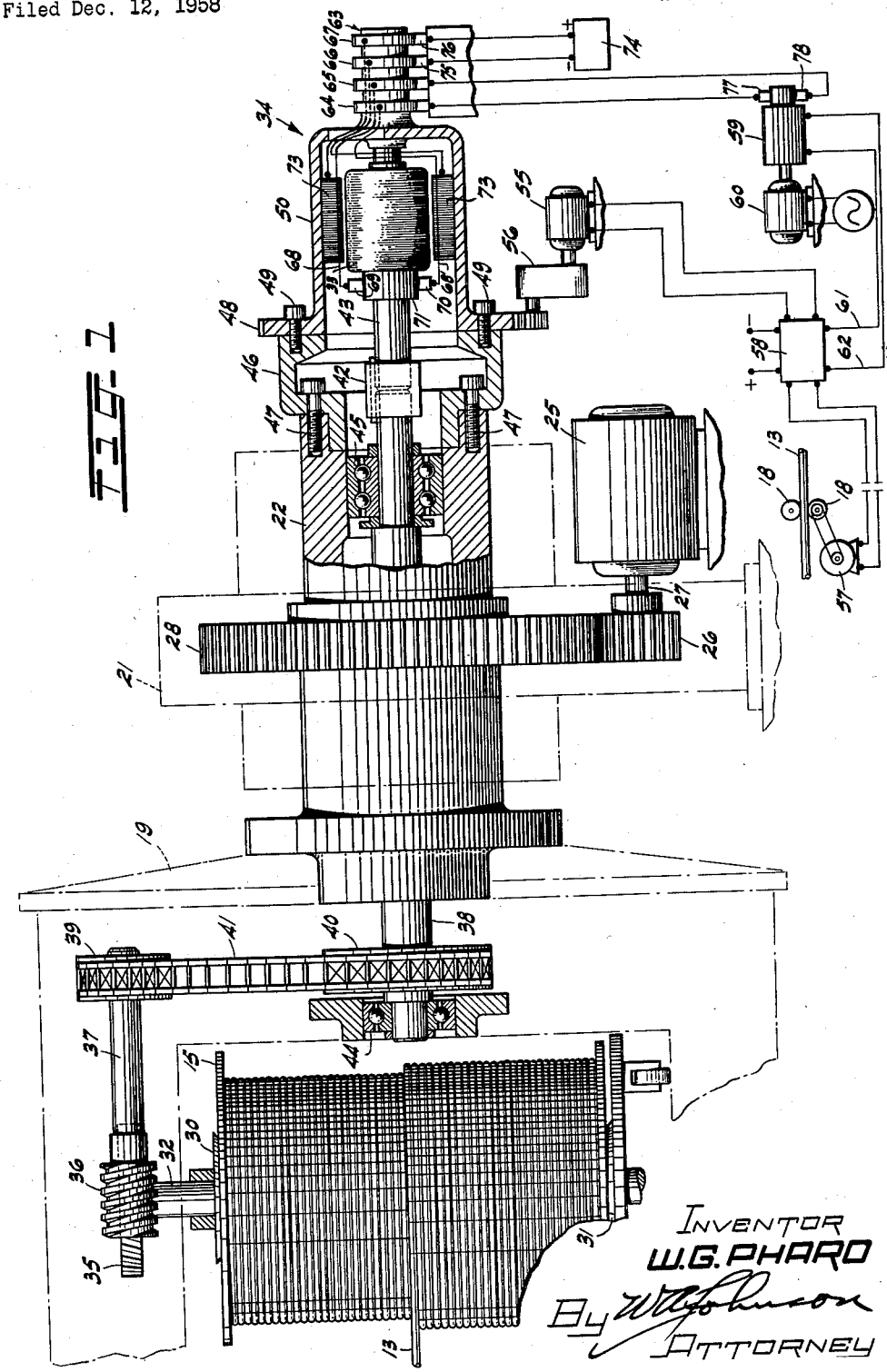

April 26, 1960 W. G. PHARO 2,933,880
DIFFERENTIAL MOTOR MOUNTING STRANDING CABLER
Filed Dec. 12, 1958 2 Sheets-Sheet 2

INVENTOR
W.G. PHARO
By W.G. Johnson
ATTORNEY

2,933,880

United States Patent Office
Patented Apr. 26, 1960

2,933,880

DIFFERENTIAL MOTOR MOUNTING STRANDING CABLER

William G. Pharo, Wayne, N.J., assignor to Western Electric Company, Incorporated, New York, N.Y., a corporation of New York Application December 12, 1958, Serial No. 779,993

3 Claims. (Cl. 57—66.5)

This invention relates to cable manufacturing apparatus and particularly to such apparatus of the revolving takeup type.

In the manufacture of telephone cable it is common practice to produce the required twist or lay in the cable by mounting a takeup reel in a cradle and rotating the cradle about an axis aligned with the path of the cable as it is advanced by the rotation of the takeup reel. Since the twist per unit length should be constant, the cradle speed must bear a constant relation to the rate of linear travel of the cable and the reel speed about its own axis therefore must be progressively reduced as the cable builds up on the reel.

In one well known cable manufacturing apparatus, as disclosed, for example, in Patent 1,920,182 to Boe, the cable is advanced by a capstan and a takeup reel in a revolving cradle is driven by an external power shaft through a planetary system including a massive ring gear floating on the cradle. In another cable manufacturing apparatus of this general type, the use of such gearing is avoided by driving the reel with a hydraulic motor having special means for varying its speed to maintain constant tension in the cable between the capstan and the takeup. In such apparatus the major portion of the work of advancing the cable is performed by the capstan and the function of the reel drive is mainly to takeup at constant tension the cable supplied to it by the capstan.

In cable manufacturing apparatus where no capstan is provided and the cable is advanced solely by the takeup reel drive, the problem of maintaining constant tension is greatly complicated. This is especially true where the apparatus must be capable of running at various speeds and of making cables having a wide range of twist lengths with the cradle rotating in either direction. The problem could be simplified considerably if the ratio between the speeds of the reel drive and the reel itself could be held constant and made independent of the direction of cradle rotation. In apparatus of the Boe type, however, this would involve further complicate the structure by the use of differential gearing or its equivalent and would not produce a satisfactory solution.

The object of this invention is an improved and simplified drive for the reel of a revolving-cradle type cable takeup.

According to the invention, a motor for driving the reel is mounted on the cradle with its shaft concentric with the cradle shaft so that the normally stationary structure of the motor rotates with the cradle and the speed of the motor shaft with respect to the speed of the reel is independent of changes in cradle speed or direction of rotation. This greatly reduces the speed range over which the motor must operate and correspondingly simplifies the problem of controlling the motor speed as required to produce the desired constant lay in the cable as it builds up on the reel. For best speed regulation the motor is of the direct current type with its field structure secured to the cradle and its armature shaft connected to the reel. The field and armature windings are supplied with current through sliding contacts, preferably stationary brushes and slip rings rotating with the field structure. In most cases the cradle shaft will be hollow and the motor shaft will pass therethrough into the cradle to make driving connection with the reel.

Figure 2:
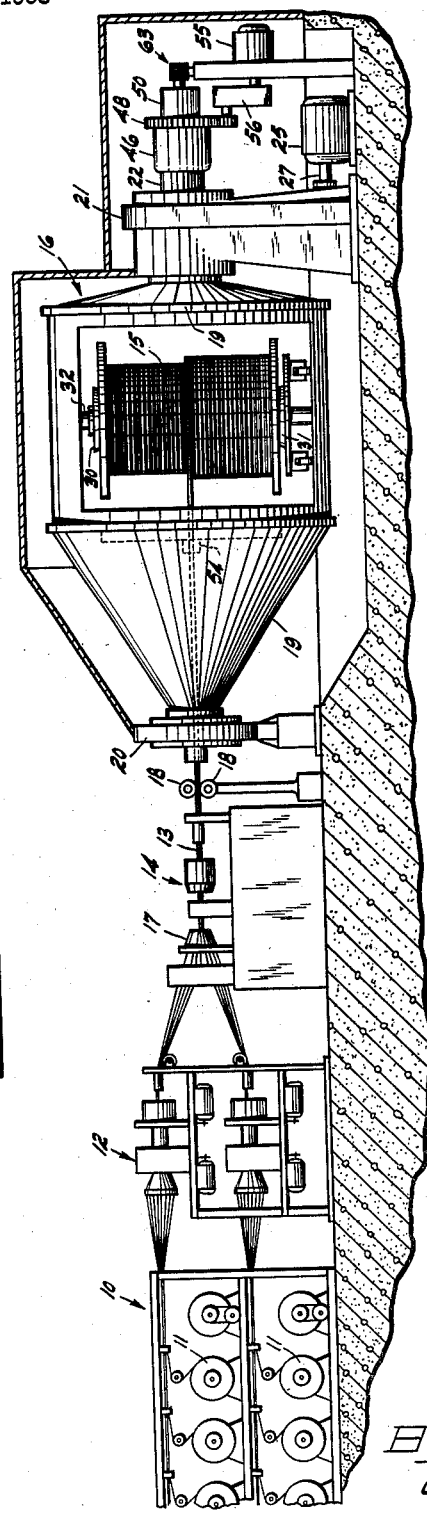

Other objects and advantages will be apparent from the following detailed description when considered in conjunction with the accompanying drawings, wherein:

Fig. 1 is a fragmentary side elevational view, portions of which are shown in section, of a takeup mechanism embodying the invention, and Fig. 2 is a schematic side elevational view of a stranding cabler embodying the invention.

The stranding cabler selected to illustrate the invention includes supply stands 10 having a plurality sets of supply reels 11 for groups of strands or insulated wires. The groups of wires are formed into cable units as they are advanced through unit binders 12 where the wires of each group are bound together in any desired manner. After leaving the unit binders 12 the cable units are brought together before they enter a core binder 14. The units of the cable core 13 are to be twisted together prior to being wound on a takeup reel or core truck 15 in the takeup unit 16 by conventional distributor mechanism 54. The twisting of the units together takes place at a die 17 in advance of the core binder and after leaving the core binder the core moves between rollers 18 and is guided thereby into the takeup unit 16 along its center line which is coincident with the axis of a cradle 19 in which the core truck 15 is mounted.

The cradle 19 has a forward bearing 20 and a rearward bearing 21, the latter supporting a hollow shaft 22 of the cradle. The means for rotating the cradle in either direction to form predetermined spiral twists in the units forming the core includes a reversible motor 25 having a pinion 26 mounted on the motor shaft 27 and interengaging a ring gear 28 which is mounted on the hollow shaft 22. The core truck 15, when mounted in the cradle 19 is supported between suitable connecting means such as cone centers 30 and 31 for rotation with a driven shaft 32. The shaft 32 is connected to the rotor 33 of a motor 34 through a worm gear 35 on shaft 32, a worm 36 on a shaft 37, a connection of shaft 37 with a drive shaft 38 including sprockets 39 and 40 and a chain 41 and coupling 42 joining shaft 38 to motor shaft 43. The drive shaft 38, journaled in suitable bearings 44 and 45, extends through the hollow shaft 22 and has its axis coincident with the axis of the cradle. A housing 46 mounted at 47 on the outer end of the hollow shaft 22 has a cover plate 48 secured thereto at 49. The housing 50 of the motor 34 is fixed to the cover plate 48 so that it will rotate in either direction with the cradle 19 and its hollow shaft 22.

It is important that the motor 34 drive the reel 15 so as to maintain a constant ratio between the linear speed of the cable and the rotary speed of the cradle 19. Since the effective diameter of the reel increases with each layer of cable wound on it and the amount of the increase in speed varies with the size of the cable being made, the speed of the reel must be decreased at intervals by definite amounts as a cable builds up on the reel.

This is accomplished by a well known type of self-synchronizing system including a master unit 55 connected through suitable gearing 56 to the housing 46 so as to generate a potential proportional to the speed of the cradle 19 and a follower unit 57 driven by one of the rolls 18 to generate a potential proportional to the linear speed of the cable. These potentials are applied to the unit 58 and any change in their ratio produces compensating changes in the speed of the takeup reel 15 in any suitable manner. For example, power may be supplied to the cradle motor 34 from a direct current generator 59 driven by motor 60 and the field current, supplied over wires 61—62 from the control unit 58 to the generator, may be varied with changes in the ratio of the outputs to vary the generator output and hence the speed of the motor 34 as required.

Since both the field and the armature of this motor rotate, the armature and field leads cannot be directly connected to the housing. The motor is therefore provided with an extension 63 on which are mounted armature connecting members such as slip rings 64, 65 and field connecting members such as slip rings 66, 67. The armature rings are connected by wires 68, 68' to brushes 69, 70 engaging the commutator 71 of the armature 33 on the shaft 43, and the field rings are connected directly to the field coils 73. Constant field current is supplied to these rings from a source 74 through stationary brushes 75, 76, as indicated, and the varying armature current from the generator 59 passes through brushes 77—78 to the rings 64—65.

In the structure described it will be apparent that since the housing 50 of the motor 34 rotates with the cradle, the ratio of the "motor speed" (that is the r.p.m. of its armature with respect to its field) to the r.p.m. of the reel 15 remains the same for all linear cable speeds and for either direction of cradle rotation. On the other hand, when, as has been done heretofore, the reel drive motor is mounted externally of the machine, the cradle speed effectively is added to the motor speed during rotation of the cradle in one direction and effectively subtracted therefrom during rotation in the other direction. It therefore will be seen that an external mounted motor has to be operated over a wide speed range to drive the reel over the much narrower speed range required. By mounting the motor on the cradle according to this invention, the effect of the cradle rotation is automatically eliminated and the problem of regulating the reel drive is greatly simplified.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a cable manufacturing apparatus the combination with means to guide a plurality of insulated wires advancing into engagement with each other to form a cable, a reel for advancing and taking up the cable mounted for rotation about an axis at right angles to the axis of the cable, a cradle rotatable about an axis for supporting the reel and means for rotating the cradle in either direction about its axis to form a twist in the cable as it is taken up on the reel, of a motor having a shaft connected to the reel, means for changing the speed of the motor as the cable builds up on the reel, and means for supporting the motor housing for rotation with the cradle with the shaft of the motor on the cradle axis to make the ratio of the speed of the motor shaft to the speed of the reel independent of the speed and direction of cradle rotation.

2. Apparatus according to claim 1 in which the cradle is supported at one end on a hollow member and the motor shaft is connected to the reel through the hollow member.

3. A take-up for a cable manufacturing apparatus having means to guide a plurality of strands into engagement with one another to form a cable, comprising a cradle mounted for rotation about a first axis, means to guide the cable along the first axis into the cradle, a take-up reel rotatably mounted in the cradle on a second axis perpendicular to the first axis and for rotation with the cradle about the first axis, means to rotate the cradle at a predetermined rate about the first axis to form a twist in the strands of the cable, means to drive the reel including a motor having a housing fixed for rotation with the cradle about the first axis and a rotor coaxial with the first axis, and electrical connecting members mounted on and rotating with the motor housing for conducting current into the motor windings.

References Cited in the file of this patent

UNITED STATES PATENTS

| 2,287,708 | Reynolds et al. | June 23, 1942 |
| 2,454,329 | Merwin et al. | Nov. 23, 1948 |

FOREIGN PATENTS

| 563,746 | Germany | Nov. 9, 1932 |